Feb. 26, 1952     H. KESSLER     2,587,168
WINDSHIELD WIPER
Filed March 9, 1949     2 SHEETS—SHEET 1
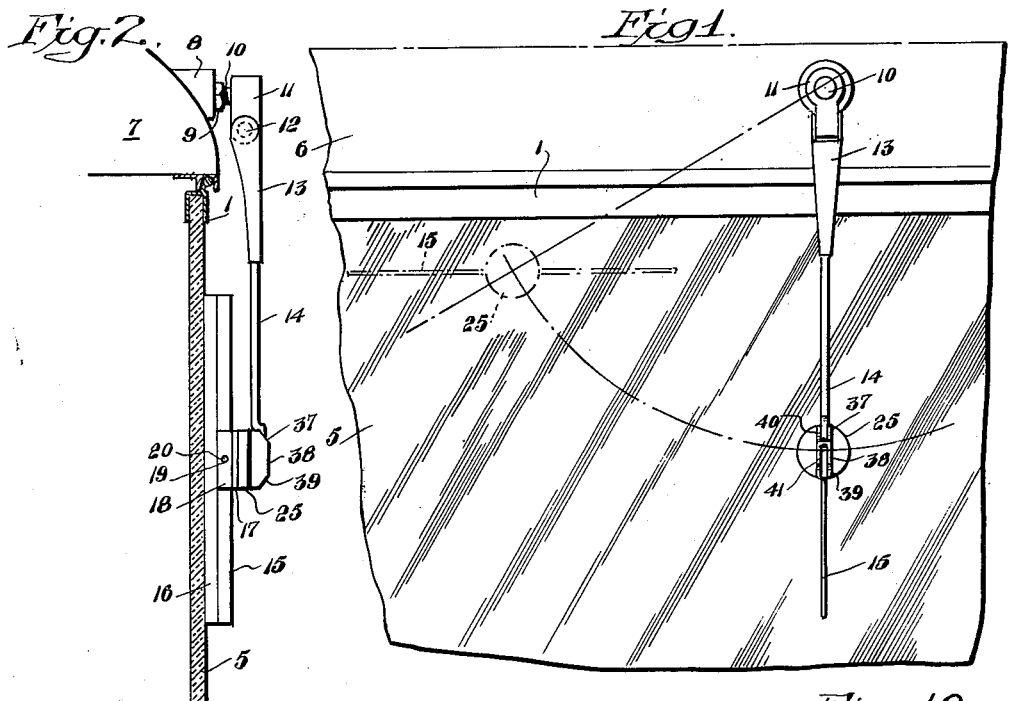
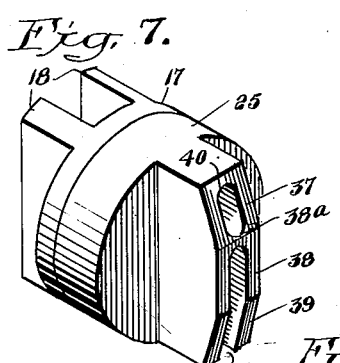
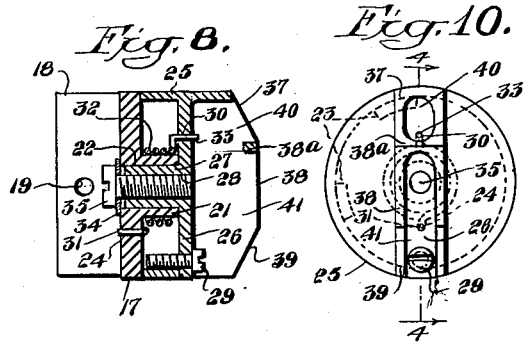
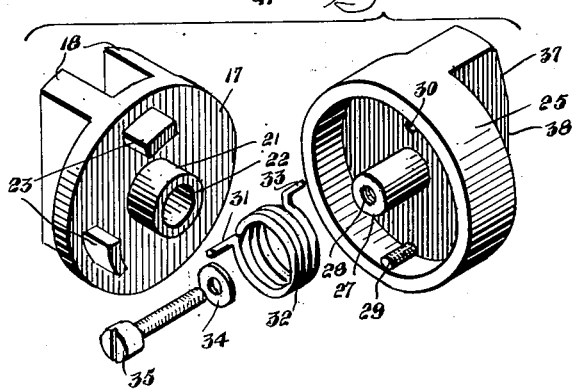
INVENTOR
*Hyman Kessler*
BY *John W. Smith*
AGENT Feb. 26, 1952 H. KESSLER 2,587,168
WINDSHIELD WIPER
Filed March 9, 1949 2 SHEETS—SHEET 2
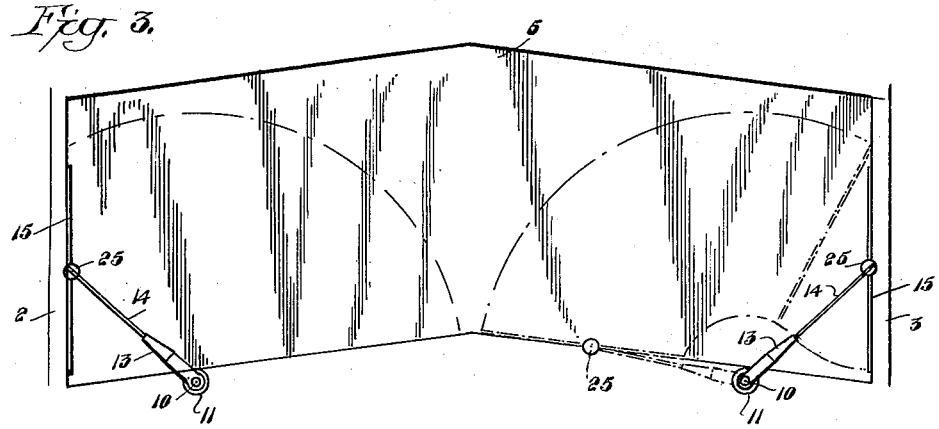
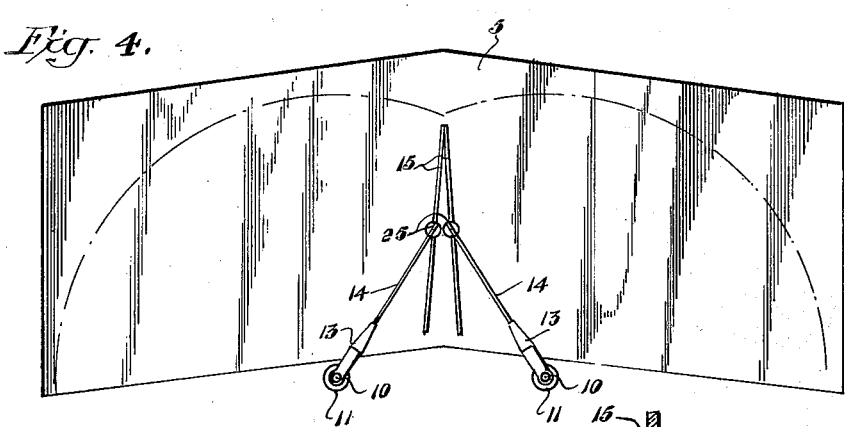
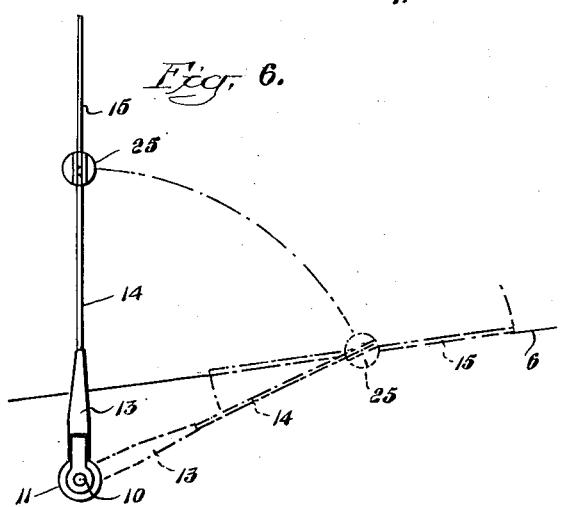
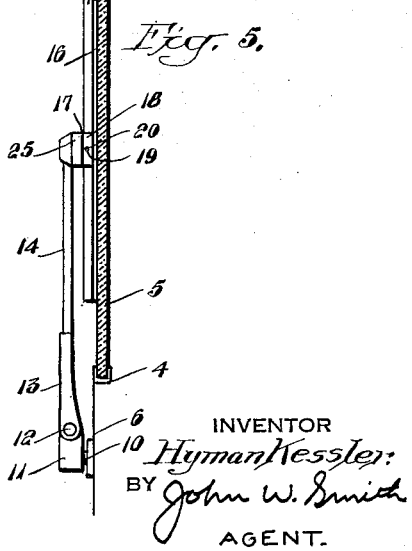
INVENTOR
Hyman Kessler
BY John W. Smith
AGENT.

Patented Feb. 26, 1952

2,587,168

UNITED STATES PATENT OFFICE 2,587,168

WINDSHIELD WIPER

Hyman Kessler, Washington, D. C.

Application March 9, 1949, Serial No. 80,526

3 Claims. (Cl. 287—93)

This invention relates to a windshield wiper for the windshields of automobiles.

More specifically the invention relates to a pivotal connecting device between the oscillating wiper arm and the backing strip of the wiper blade.

It is the primary object of the invention to provide a pivotal connecting device interposed between the oscillating wiper arm and the backing strip of the wiper blade that will enable the blade to sweep out a greater arc than the ordinary fixed connection.

It is another object of the present invention to provide a pivotal connecting device interposed between the oscillating wiper arm and the backing strip of the wiper blade, which when applied to the types of wipers mounted at the top of the windshield frame, will enable the blade to sweep out an arc of at least 180 degrees.

It is a further object of the present invention to provide a pivotal connecting device interposed between the oscillating wiper arm and the backing strip of the wiper blade, which when applied to the types of wipers mounted at the bottom of the windshield frame, will enable the blade to sweep out an approximately 90 degree arc bounded by the bottom and side of the windshield frame, respectively.

It is an additional object of the present invention to provide a pivotal connecting device interposed between the oscillating wiper arm and the backing strip of the wiper blade, which when two (2) wipers are mounted in tandem relationship at the bottom of the windshield frame, will enable the blades to sweep substantially the entire windshield.

It is still another object of the present invention to provide a pivotal connecting device interposed between the oscillating wiper arm and the backing strip of the wiper blade, for the accomplishment of the above described and other objects, which can be readily manufactured out of commercially available materials and by simple machining operations.

It is a still further object of the present invention to provide a pivotal connecting device between the oscillating wiper arm and the backing strip of the wiper blade which can be incorporated into existing windshield wipers without any modification of the latter.

With the above and still other objects in view, the invention consists in the combination and arrangement of elements and features of the mechanism as will be hereinafter described in the following specification and illustrated in the accompanying drawing, which discloses the preferred embodiment of the invention, and pointed out in the claims hereunto appended.

Reference is now made to the accompanying drawing, in which;

Figure 1 is a front elevational view showing a section of an automobile windshield with the windshield wiper mounted at the top of the windshield frame, this being a conventional arrangement on automobiles manufactured prior to 1939;

Figure 2 is a side elevational view of the structure shown in Figure 1, the windshield glass being shown in section;

Figure 3 is a view similar to Figure 1 but showing two windshield wipers mounted in tandem approximately centrally of the right and left sections of the windshield, this being a well known arrangement on the late model Nash, Packard, and Studebaker automobiles;

Figure 4 is a view similar to Figure 3 but showing the windshield wipers mounted near the vertical center line of the windshield, as on the late model Chrysler automobiles;

Figure 5 is a side elevational view of the structure shown in either Figure 3 or Figure 4, the windshield glass being shown in section;

Figure 6 is a detail view showing the operation of the pivotal connection of the present invention to permit the wiper blade to pivot about its center on the oscillating arm so as to end its travel abutting the lower member of the windshield frame.

Figure 7 is a perspective view of the pivotal connecting device of the present invention;

Figure 8 is a vertical sectional view of this pivotal connecting device;

Figure 9 is a combined exploded and perspective view of the pivotal connecting device of the present invention; and, Figure 10 is a front elevational view of the pivotal connecting device.

Referring now to Figures 1 and 2 there is here shown at 7 an upper frame member of the automobile body against the bottom of which near its outer edge a horizontal windshield frame member 1 is mounted. Side frame members of the windshield frame are shown at 2 and 3, respectively, in Figure 3, and a bottom frame member at 4 mounted on a body frame member 6, in Figure 5. The windshield glass 5 is held in position by the windshield frame members 1, 2, 3, and 4. A boss 8 is formed on the body frame member 6 through which the rock shaft 10 from the windshield wiper motor (not shown) extends. Around the rock shaft 10 there is positioned a packing gland 9 which abuts the boss 8. On the outer end of the rock shaft 10 there is mounted a hub member 11 to which there is secured by a bolt or pin 12 an arm holder or socket 13. An oscillating arm 14 is mounted in the arm holder 13 in any suitable manner. The actual wiping of the windshield glass 5 is done by a blade 16 of suitable rubber composition material, which blade is mounted in and carried by a backing strip 15 and is adapted to sweep across the windshield glass.

The above described structure is conventional and forms no part of the present invention.

The pivotal connecting device of the present invention is shown in Figures 7 to 10, inclusive.

Referring now to Figures 8 and 9, the driven element of the pivotal connecting device is comprised principally by a disc member 17, having parallel chordal flanges 18—18 on its outer face. These parallel flanges are adapted to receive the backing strip 15, which mounts the wiper blade 16, in close fitting relationship, and a hole 19 through the flanges provides for a screw 20 (Fig. 2) which secures the backing strip in position.

On the inner face of the disc member 17 there is formed an integral central boss 21 having an axial hole 22 therethrough. Also on the inner face of the disc member 17 there are formed two (2) arcuately spaced abutment lugs or stops 23—23. Below the central boss 21 there is a hole 24 (Fig. 8) through the disc member 17 for a purpose to be hereinafter stated.

The driving element of the pivotal connecting device is comprised principally by a cylindrical member 25 and an integral disc member 26, the latter having an integral cylindrical boss 27 on its inner face and there being an axially positioned threaded hole 28 through the boss. The length of the cylindrical boss 27 exceeds that of the cylindrical member 25 by an amount approximately equal to the thickness of the disc member 17, for a purpose which will appear hereinafter. A stop screw 29 extends through the disc member 26 and is positioned adjacent the inner wall of the cylindrical member 25. A hole 30 is formed through the disc member 26 and above the cylindrical boss 27 thereon, for a purpose to be hereinafter stated.

Referring now to Figure 8, wherein the pivotal connecting device is shown in assembled relationship, the central boss 27 on the driving element 25 fits within the axial hole 22 in the central boss 21 on the driven element 17, in bearing relationship, the rim of the cylindrical member 25 of the driving element abutting the disc member 17 of the driven element, also in bearing relationship. A coiled tension spring 32 has its ends 31 and 33 extended parallel to its axis. This spring is adapted to surround the central boss 21 on the driven element 17 in relatively close fitting relationship, the end 31 extending into the hole 24 in the driven element 17 and the end 33 extending into the hole 30 in the driving element 25. The stop screw 29 on the disc member 26 of the driving element 25 is adapted to be positioned intermediate the arcuately spaced stops 23—23 on the disc member 17 of the driven element.

The driven element 17 and the driving element 25 are held in assembled relationship by a screw 35, having a washer 34 under its head abutting the outer face of the disc member 17, the screw itself being received in the axial threaded hole 28 in the driving element 25.

On the outer face of the disc member 26 of the driving element there is formed an integral diametral flange which has its top formed in three sections, a first sloping section 37, a middle section 38 parallel to the disc member 26, and a second sloping section 39. The first sloping section 37 of the flange has a hole 40 therein; the middle section 38 and the second sloping section 39 have a deep slot 41 formed therein, which slot extends in depth to the plane of the outer face of the disc member 26. The hole 40 in the sloping section 37 of the flange is elongated along the diameter of the disc member 26 to an oblate oval and is drilled at an angle so as to merge with the slot 41 in the middle flange section 38, leaving only a bridge portion 38a at the juncture of the first sloping top section 37 and the middle section 38 of the flange.

Ordinarily the oscillating arm 14 is attached to the backing strip 15 of the wiper blade in one of several ways. The arm may have a hook on its lower end which is received in a hole in the backing strip. In applying the pivotal connecting device of the present invention to such a wiper, this hook would be received in the hole 40 in the flange section 37 by a force fit. Alternatively, the oscillating arm 14 may have a detent on its outer end which is received by a bridge member on the backing strip. In applying the pivotal connecting device of the present invention to a windshield wiper so constructed, the bridge section 38a between the hole 40 and the slot 41 in the diametral flange would form a bight to receive the nose of the detent. The slot 41 in the flange sections 38 and 39 also provides for the drilling and threading of the hole for and the positioning of the stop screw 29.

The operation of the pivotal connecting device of the present invention is as follows: The oscillating arm 14 sweeps back and forth over the windshield glass 5 and the rubber composition blade 16 clears a sector of the glass. In the windshield wipers of the prior art, where the backing strip 15 is directly connected to the oscillating arm 14, this sector is bounded at either end by a radius through the axis of the rock shaft 10. There is of course an unswept section between each boundary radius and the frame of the windshield. This is fully shown by the dotted line position of the wiper blade in Figure 3. When the pivotal connecting device of the present invention is employed however, the arcuate area which is swept out is increased materially. As the oscillating arm 14 approaches the right terminus of its arc (Figures 1, 3, and 4), the backing strip 15 and the blade 16, due to their inertia, swing in the counter-clockwise direction to more closely approach or abut the side windshield frame member 3 (Figure 3) or the bottom windshield frame member 6 (Figure 6), as the case may be, thereby coiling up the spring 32. As the stroke of the oscillating arm 14 in the opposite direction gets under way, the spring 32 re-coils itself and thereby brings the backing strip 15 and the wiper blade 16 into their relatively normal position in alignment with the oscillating arm 14. At the opposite end of the stroke of the oscillating arm 14 the action of the pivotal connecting device is very much the same except that here the spring 32 is further uncoiled and, as the opposite return stroke of the oscillating arm 14 gets under way, this spring again re-coils itself to likewise bring the backing strip 15 and the wiper blade 16 into their relatively normal position in alignment with oscillating arm 14.

Figure 1 which illustrates the pivotal connecting device of the present invention applied to a windshield having the wiper mounted over the top of the windshield frame, as was common on automobiles manufactured prior to 1939, shows how the wiper blade 15 is enabled to closely approach the top windshield frame member 1 in parallel relationship thereto at the end of its stroke, thereby sweeping clear a sector of the windshield glass 5 which approximately subtends a 180 degree angle.

Figure 3, which illustrates the pivotal connecting device of the present invention applied to both of the windshield wipers mounted in tandem relationship to the outside of the vertical center lines of a two section windshield, as is common construction on the Nash, Packard, and Studebaker automobiles manufactured since 1939, and also on the more recent models of the General Motors Corp. automobiles, shows the wiper blades 15—15 clearing approximately 90 degree sectors which extend from the left and right windshield frame members 2 and 3, respectively, to the bottom of the windshield glass 5. With the usual windshield wipers, where the oscillating arm is fixedly attached to the backing strip of the wiper blade, there are left at either end of the swept sectors unswept areas of substantially triangular shape extending to the left and right windshield side frame members 2 and 3, respectively (illustrated between the dotted line position and full line position of the right wiper blade 15). These unswept areas diminish the field of vision of the driver of the automobile, particularly when making turns.

Figure 4, which illustrates the pivotal connecting device of the present invention applied to both of the windshield wipers mounted in tandem relationship adjacent the apex of a two section windshield having the sections at an obtuse angle with respect to each other, as is common construction on the Chrysler Corp. automobiles manufactured since 1939, shows the two wiper blades 15—15 substantially abutting each other at the right end of the stroke of the one and the left end of the stroke of the other, whereby they sweep out approximately 90 degree sectors of the windshield glass 5, which sectors extend from the apex of the dihedral angle between the windshield sections to the bottoms of the sections, leaving unswept areas of minor extent at the right and left upper corners, respectively, of the two sections.

While I have illustrated and described herein the preferred embodiment of my invention, it is to be understood that various changes in the sizes, shapes, and the relative arrangement of the various parts may be made without departing from the spirit of the invention as defined in the following claims.

What is claimed is:

1. In a pivotal connecting device adapted to be interposed between the oscillating arm and the wiper blade of a windshield wiper, a driving element adapted to be connected to the oscillating arm, a driven element adapted to be connected to the wiper blade, said driven element having a central boss thereon with a central bore therethrough, a driving element having a central boss thereon with a central bore therethrough, the central boss on the driving element being received in the bore in the central boss on the driven element, a pivot through the driven element and the central boss on the driving element, a pair of arcuately spaced stops on one of said elements, a single stop on the other of said elements positioned intermediate said arcuately spaced stops, and a torsion spring surrounding the central boss on the driven element and connected at its ends to the driving and the driven elements, respectively.

2. In a pivotal connecting device adapted to be interposed between the oscillating arm and the wiper blade of a windshield wiper, a driving element adapted to be connected to the oscillating arm and comprising an outer cylinder, an end disc, and a central boss on the end disc having a bore therethrough, a driven element adapted to be connected to the wiper blade and comprising a disc with a central boss thereon having a bore therethrough, the central boss on the driving element being received in the bore in the central boss on the driven element, a pivot through the disc of the driven element and extending into the bore in the central boss on the driving element, a pair of arcuately spaced stops on the driven element spaced radially outwardly from the central boss thereon, a single stop on the end disc of the driving element and spaced radially outwardly from the central boss thereon so as to be positioned intermediate the stops on the driven element, and a torsion spring surrounding the central boss on the driven element and enclosed by the outer cylinder on the driving element, said torsion spring having one end connected to the end disc of the driving element and the other end connected to the disc of the driven element.

3. In a pivotal connecting device adapted to be interposed between the oscillating arm and the wiper blade of a windshield wiper, a driving element adapted to be connected to the oscillating arm and comprising an outer cylinder, an end disc, and a central boss on the end disc having a bore therethrough, a driven element adapted to be connected to the wiper blade and comprising a disc adapted to abut and register peripherally with the outer cylinder on the driving element and having a central boss thereon of length equal to the depth of said cylinder and a bore therethrough, the central boss on the driving element being received in the bore through the central boss on the driven element, a pivot through the disc of the driven element and extending through the bore in the central boss on the driving element, a pair of arcuately spaced stops on the driven element spaced radially outwardly from the central boss thereon, a single stop on the end disc of the driving element and spaced radially outwardly from the central boss thereon so as to be positioned intermediate the stops on the driven element, and a torsion spring surrounding the central boss on the driven element and enclosed by the outer cylinder on the driving element, said torsion spring having one end connected to the end disc of the driving element and the other end connected to the disc of the driven element.

HYMAN KESSLER.

REFERENCES CITED

The following references are of record in the file of this patent:

UNITED STATES PATENTS

| Number | Name | Date |
|---|---|---|
| 1,410,325 | Kupferman | Mar. 21, 1922 |
| 1,695,326 | Folberth et al. | Dec. 18, 1928 |
| 1,727,456 | Uddenborg | Sept. 10, 1929 |
| 2,030,286 | Evans | Feb. 11, 1936 |
| 2,185,572 | Sawyer | Jan. 2, 1940 |
| 2,242,303 | Irmischer | May 20, 1941 |
| 2,286,004 | O'Shei | June 9, 1942 |